United States Patent
Brunette et al.

(10) Patent No.: US 8,161,520 B1
(45) Date of Patent: Apr. 17, 2012

(54) METHODS AND SYSTEMS FOR SECURING A SYSTEM IN AN ADAPTIVE COMPUTER ENVIRONMENT

(75) Inventors: Glenn M. Brunette, Medford Lakes, NJ (US); David Walker, Huntingdon (GB)

(73) Assignee: Oracle America, Inc., Redwood City, CA (US)

( * ) Notice: Subject to any disclaimer, the term of this patent is extended or adjusted under 35 U.S.C. 154(b) by 2625 days.

(21) Appl. No.: 10/837,063

(22) Filed: Apr. 30, 2004

(51) Int. Cl.
*G06F 17/00* (2006.01)
*H04L 29/06* (2006.01)

(52) U.S. Cl. .......................................... 726/1; 713/200
(58) Field of Classification Search .................... 726/1
See application file for complete search history.

(56) References Cited

U.S. PATENT DOCUMENTS

| | | | | |
|---|---|---|---|---|
| 5,761,477 A * | 6/1998 | Wahbe et al. | | 718/1 |
| 5,917,912 A * | 6/1999 | Ginter et al. | | 713/187 |
| 5,968,176 A * | 10/1999 | Nessett et al. | | 726/11 |
| 6,008,259 A * | 12/1999 | Exner et al. | | 514/693 |
| 6,119,171 A * | 9/2000 | Alkhatib | | 709/245 |
| 6,151,618 A * | 11/2000 | Wahbe et al. | | 718/1 |
| 6,167,513 A * | 12/2000 | Inoue et al. | | 713/150 |
| 6,243,749 B1 * | 6/2001 | Sitaraman et al. | | 709/223 |
| 6,678,827 B1 * | 1/2004 | Rothermel et al. | | 726/6 |
| 6,721,888 B1 * | 4/2004 | Liu et al. | | 713/191 |
| 7,017,183 B1 * | 3/2006 | Frey et al. | | 726/5 |
| 2002/0129128 A1 * | 9/2002 | Gold et al. | | 709/220 |
| 2004/0083382 A1 * | 4/2004 | Markham et al. | | 713/200 |

* cited by examiner

*Primary Examiner* — Kambiz Zand
*Assistant Examiner* — Dant Shaifer Harriman
(74) *Attorney, Agent, or Firm* — Marsh Fischmann & Breyfogle LLP; Kent A. Lembke

(57) ABSTRACT

An automated method for securing a target system is provided. In this method, a request to change an entity in the target system is detected. The target system has an existing security profile or one is created. As a result, a security configuration group associated with the changed entity is constructed. The security configuration group is then fused with the existing security profile to form a unified security profile, and the unified security profile is prosecuted onto the target system. Other methods and a system for securing the target system are also described.

24 Claims, 11 Drawing Sheets

METHODS AND SYSTEMS FOR SECURING A SYSTEM IN AN ADAPTIVE COMPUTER ENVIRONMENT

BACKGROUND OF THE INVENTION

1. Field of the Invention

The present invention relates to information security and, more particularly, to automated methods and systems for securing a target system.

2. Description of the Related Art

In dynamic computing environments, devices, applications, and networks of devices and applications may be provisioned at any point in their lifecycle. These networks, devices, and applications may be installed, updated, reconfigured, or decommissioned, and this is likely to happen many times throughout their lifecycle. Furthermore, in such dynamic computing environments, applications may be moved between running systems in an effort to recover from the loss of systems, to adjust changing resources requirements, or to support some other transition process.

The security needs of devices and applications in a dynamic computing environment are difficult to meet because the computing environment changes constantly. For example, traditionally, servers are often dedicated, meaning that they typically perform no other tasks than are required to support a business or technical requirement. As a result, most security configurations or security postures of servers are built and deployed specifically for the servers' particular needs. However, in a dynamic computing environment, services/applications are often added to or removed from existing server configurations to meet the changing needs of the dynamic computing environment. For instance, a Web server and a File Transfer Protocol (FTP) server may both concurrently coexist on one target system.

The problem with running the Web server on a system purposed as an FTP server is that the FTP server cannot accommodate the Web server's security needs because the FTP server's security posture was built and deployed specifically to the needs of the FTP server. One method to accommodate the Web server's security needs is for a user to manually rebuild and redeploy a new security posture according to the combined needs of the two services. However, such manual rebuilds are complicated, time consuming, and labor intensive. For example, a typical Solaris system, an operating environment developed by Sun Microsystems, can require 100 changes to move from a default security posture to a security posture focused on providing a small set of services to different classes of users via different network interfaces in a reasonably secure manner. Even if manual rebuilds for one system is manageable, many changes over the life of a network of systems is very difficult (imagine 100, 1000, or even 10,000 systems). Further, tasks assigned to the server may frequently change and it's nearly impossible for the user to constantly rebuild and re-deploy security profiles.

In view of the forgoing, there is a need to develop methods and systems for securing a system in adaptive, dynamic, and consolidated computing environments.

SUMMARY OF THE INVENTION

Broadly speaking, the present invention fills these needs by providing automated methods and systems for securing a target system. It should be appreciated that the present invention can be implemented in numerous ways, including as a process, an apparatus, a system, computer readable media, or a device. Several inventive embodiments of the present invention are described below.

In accordance with a first aspect of the present invention, an automated method for securing a target system is provided. In this method, a request to change an entity in the target system is detected. The target system has an existing security profile. As a result, a security configuration group associated with the changed entity is constructed. The security configuration group is then fused with the existing security profile to form a unified security profile and the unified security profile is prosecuted onto the target system.

In accordance with a second aspect of the present invention, a method for securing a target system is provided. In this method, a request to add an entity to the target system is received. A security configuration associated with the added entity is then added to a security configuration group. Thereafter, the security configuration group is fused with the existing security profile to form a unified security profile, and the unified security profile is then prosecuted onto the target system.

In accordance with a third aspect of the present invention, a method for securing a target system is provided. In this method, a request to remove an entity from the target system is received. Here, the target system has an existing security configuration group within an existing security profile. Next, a security configuration associated with the removed entity is removed from the existing security configuration group. Subsequently, the existing security configuration group is fused with the existing security profile to form a unified security profile, and the unified security profile is then prosecuted onto the target system.

In accordance with a fourth aspect of the present invention, a computer readable medium having program instructions for dynamically provisioning a target system in an adaptive computer environment is provided. The computer readable medium includes program instructions for receiving a request for a change to entities within the target system, whereby the change affects an entity that has a first security configuration. Thereafter, program instructions for constructing a new security configuration group are provided. The construction comprises the application of the change involving the entity that has the first security configuration. Program instructions are provided for fusing the new security configuration group with an existing security profile to form a unified security profile. Subsequently, program instructions for prosecuting the unified security profile onto the target system are provided.

In accordance with a fifth aspect of the present invention, a system for securing a target system is provided. The system includes a memory for storing an adaptive security program module and a central processing unit for executing the adaptive security program module stored in the memory. The adaptive security program module includes logic for detecting a request to change an entity in the target system; logic for adding a security configuration associated with the entity to a security configuration group if the request is to add the entity to the target system; logic for removing the security configuration associated with the entity from an existing security configuration group if the request is to remove the entity from the target system; logic for fusing the security configuration group with the existing security profile to form a unified security profile when the entity is added to the target system; logic for fusing the existing security configuration group with the existing security profile to form the unified security profile when the entity is removed from the target system; and logic for prosecuting the unified security profile onto the target system. The detection of the request to change the entity, the fusion to form the unified security profile, and the prosecution of the unified security profile are automatic.

In accordance with a sixth aspect of the present invention, an automated method for securing a target system is provided. In this method, a request to update the target system is detected whereby the target system has an existing security profile. An existing security configuration group associated with the existing security profile is selected, and the existing security configuration group is fused with the existing security profile to form a unified security profile. The unified security profile is then prosecuted onto the target system.

In accordance with a seventh aspect of the present invention, an automated method for securing a target system is provided. In this method, a request to change an entity in the target system is detected. In this case, the target system does not have an existing security profile. Next, a security configuration group associated with the changed entity is constructed and the security configuration group is fused to form a unified security profile. Thereafter, the unified security profile is prosecuted onto the target system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Various embodiments for automated methods and systems for securing a target system in an adaptive computer environment are disclosed. The embodiments described herein provides automated methods and systems by which target systems, both manually consolidated or dynamically configured, can be secured using adaptive security profiles. Security profiles are used to describe security configurations of a target system. As will be explained in more detail below, a security profile of the target system is automatically provisioned to meet the changing needs of the target system. In one embodiment, once an entity is changed in the target system, a security configuration group associated with the changed entity is fused with an existing security profile of the target system to form a unified security profile. To secure the changed target system, the unified security profile is then automatically prosecuted onto the target system.

Figure 1:
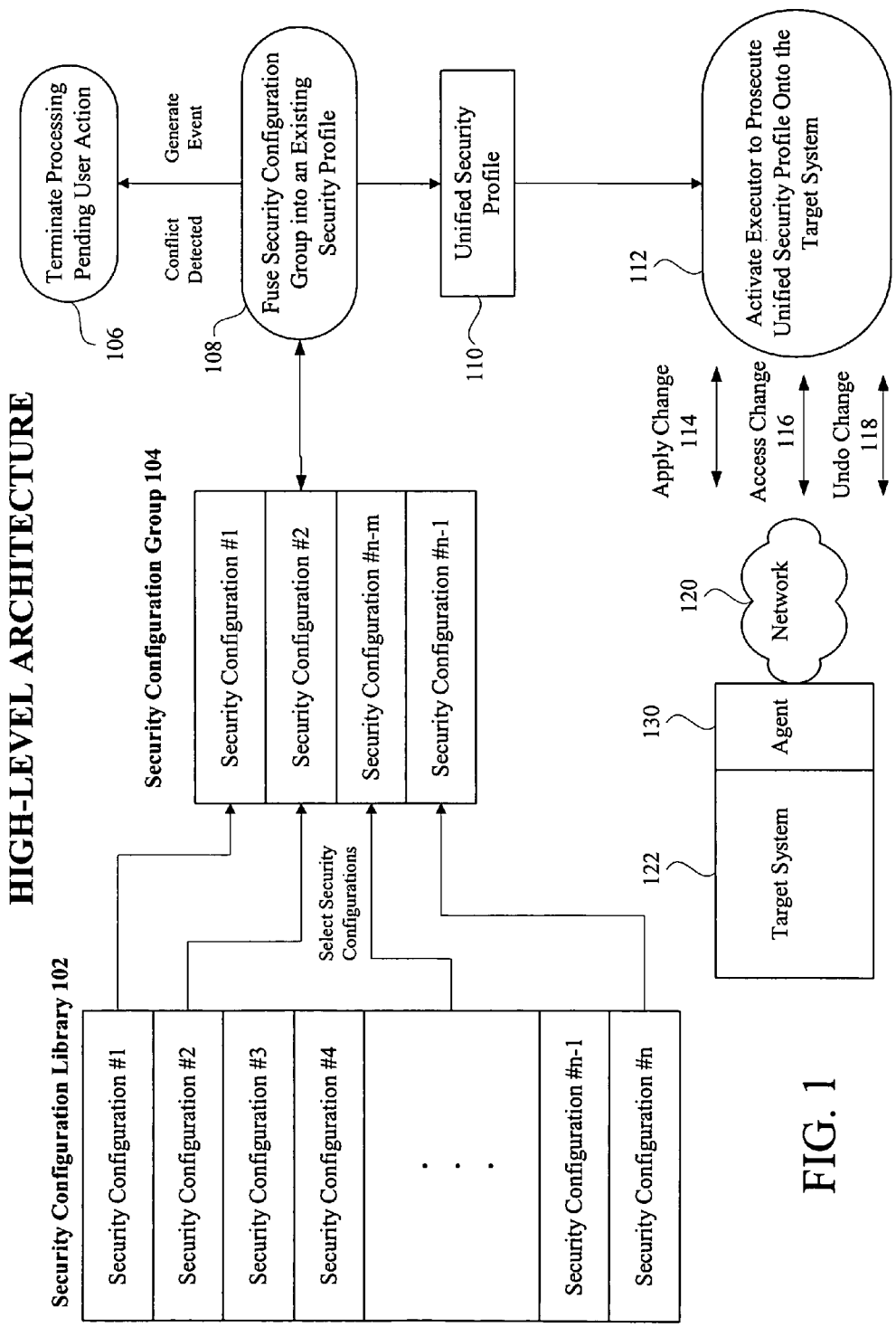
FIG. 1 is a simplified block diagram of a high level architecture overview for securing a target system, in accordance with one embodiment of the present invention.

FIG. 1 is a simplified block diagram of a high level architecture overview for securing a target system, in accordance with one embodiment of the present invention. Target system 122 refers to any suitable device, system of devices, application program, system of application programs, system application, and system of system applications. Exemplary target systems 122 include Web servers, application servers, identity servers, authentication servers, directory servers, database servers, file servers (e.g., Network File System (NFS) servers, File Transfer Protocol (FTP) servers, Samba, Microsoft Windows, etc.), print servers, proxy servers, naming service servers (e.g., Domain Name System (DNS), Network Information Service (NIS), NIS+, etc.), time servers, log servers, Sun's Solaris operating systems, Linux operating systems, Microsoft Windows operating systems, IBM Advanced Interactive eXecutive (AIX) operating systems, Hewlett-Packard-UX operating systems, Silicon Graphics IRIX operating systems, etc. Target systems 122 can be vendor specific or generic, and could also be customer defined. For example, target systems 122 may be in-house developed applications.

As shown in FIG. 1, architecture includes security configuration library 102, security configuration group 104, unified security profile 110, and target system 122. Security configuration library 102 is a storage repository populated with security configurations and groups of security configurations. As will be explained in more detail below, a security configuration is an abstract grouping of elements that describe the requirements of a specific hardware platform, hardware component (e.g., a network interface card, a cryptographic coprocessor or accelerator, etc.) or software component. Here, FIG. 1 shows all available security configurations stored in security configuration library 102. However, in another embodiment, the security configurations may be stored in more than one security configuration library 102.

When a request to change an entity in target system 122 is detected, security configuration group 104 is constructed. An entity is a component of target system 122. As such, an entity may include any suitable software/hardware function, software/hardware configuration, device, system of devices, application program, system of application programs, system application, system of system applications, operating system, framework service, etc. For example, entities include Web servers, application servers, identity servers, authentication servers, directory servers, database servers, file servers (e.g., Network File System (NFS) servers, File Transfer Protocol (FTP) servers, Samba, Microsoft Windows, etc.), print servers, proxy servers, naming service servers (e.g., Domain Name System (DNS), Network Information Service (NIS), NIS+, etc.), time servers, log servers, Sun's Solaris operating systems, Linux operating systems, Microsoft Windows operating systems, IBM Advanced Interactive eXecutive (AIX) operating systems, Hewlett-Packard-UX operating systems, Silicon Graphics IRIX operating systems, etc. Further, exemplary changes to an entity include the enablement of a Network File System (NFS), restrictions to access the NFS share, etc.

During construction, the security configurations associated with the changed entity are first selected and grouped into security configuration group 104, in accordance with one embodiment of the present invention. Thereafter, requirements (e.g., attributes) as defined by the security configurations are assembled. Security configuration group 104 is a collection of related security configurations. In another embodiment, since security configuration library 102 can store security configurations as well as groups of security configurations, groups of security configurations associated with the changed entity may also be selected and grouped into security configuration group 104.

Next, at operation 108, security configuration group 104 is fused with an existing security profile to form a unified security profile 110. As will be explained in more detail below, unified security profile 110 is a fusion of security configuration groups that collectively represent the security requirements of target system 122. During fusion 108, a check is conducted to determine whether there are any conflicts between the constraints of each security configuration within security configuration group 104 and within the existing security profile. If a conflicting constraint is detected and cannot be automatically resolved, the process of generating unified security profile 110 is terminated in operation 106 and an event is generated to notify a user to resolve the conflict. On the other hand, if there are no conflicting constraints, then security configuration group 104 and the existing security profile are merged in compliance with the constraints to form unified security profile 110.

In operation 112, an executor is then activated to receive unified security profile 110 and to prosecute the unified security profile onto target system 122. As will be explained in more detail below, prosecution 112 occurs via the executor that can execute apply operation 114, assess operation 116, and undo operation 118. The operations 114, 116, and 118 are then executed on target system 122 through communication with remote agent 130. FIG. 1 shows communication between agent 130 and executor through network 120. Generally speaking, network 120 can include any type of wire or wireless communication channel capable of linking together computing nodes (e.g., a local network, a wide area network, an open and modular development environment (EDMA) network, global systems for mobile communications (GSM) network, cable connection, etc.).

Figure 2:
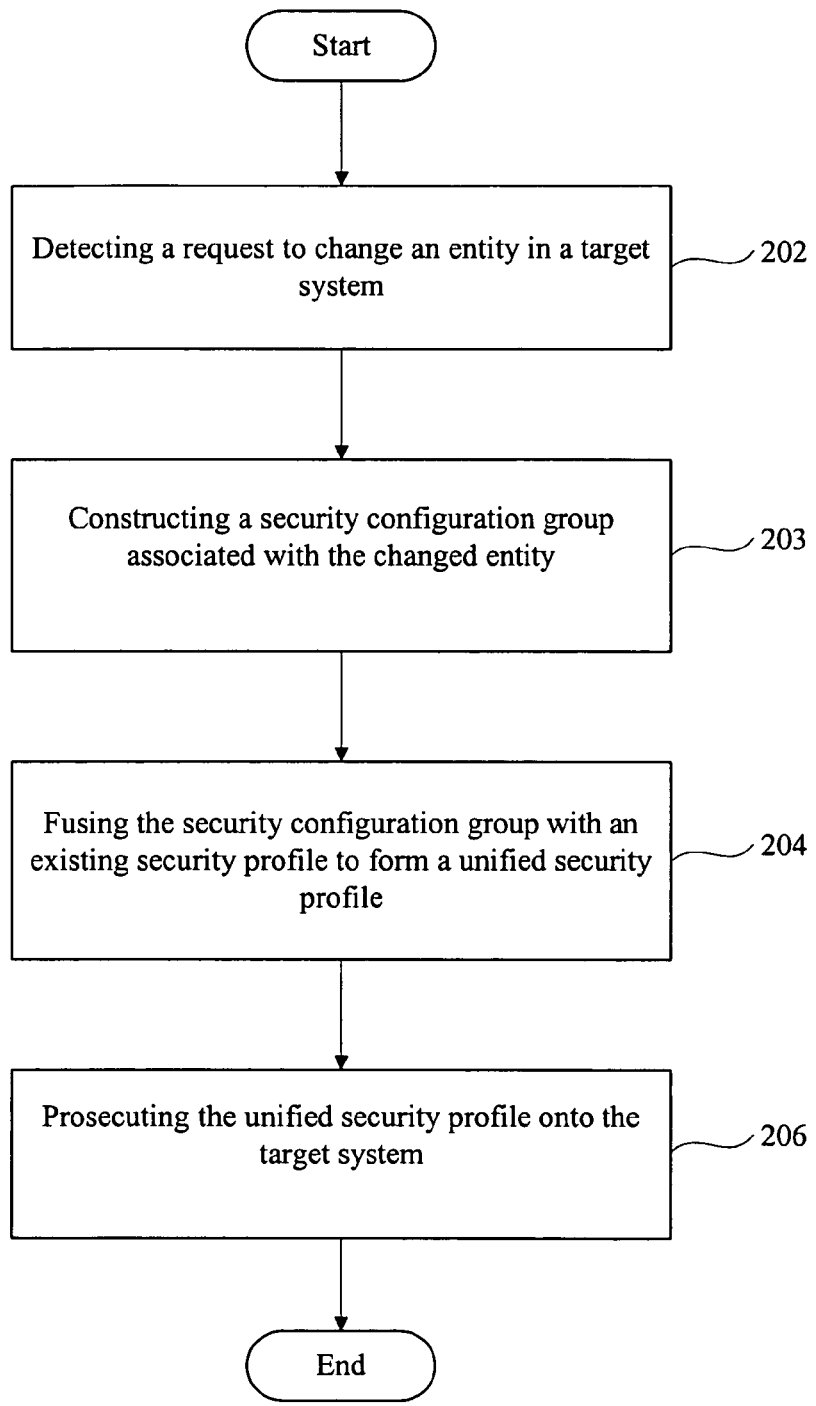
FIG. 2 is a simplified flowchart diagram of a high level overview for securing a target system, in accordance with one embodiment of the present invention.

FIG. 2 is a simplified flowchart diagram of a high level overview for securing a target system, in accordance with one embodiment of the present invention. Starting in operation 202, a request to change an entity in the target system is detected. A change is the addition or removal of an entity in the target system. After the change is detected, a security configuration group associated with the changed entity is constructed in operation 203. During construction, security configurations or groups of security configurations associated with the changed entity are added to or removed from the security configuration group. In effect, security configurations are selected based on the needs of the target system and, as such, the security configurations within the security configuration group change as the needs of the target system change. Next, the security configuration group is automatically fused with an existing security profile of the target system to form a unified security profile in operation 204.

It should be appreciated that the target system may not have an existing security configuration profile. In this case, the security configuration group is still constructed whereby security configurations or groups of security configurations associated with the changed entity are added to or removed from the security configuration group. The configuration group is then fused to form a unified security profile, in accordance with an embodiment of the present invention.

Thereafter, in operation 206, the unified security profile is prosecuted onto the target system. Specifically, prosecution is conducted through an executor that can execute an apply operation, an undo operation, and an assess operation. The apply operation applies a modification to the target system in accordance with the unified security profile. For example, modifications include installation and removal of software, configuration of features, enablement of features, disablement of features, configuration of components, enablement of components, and disablement of components, etc.

On the other hand, the undo operation undoes the modification applied to the target system. In effect, the undo operation makes no changes to the target system other than to reverse the modifications of the apply operation. If any conflicts are detected during the undo operation, then the undo operation may be aborted entirely based on configurable parameters. Alternatively, in another embodiment, a partial undoing of the modification made may be possible. In still another embodiment, an undo policy may be defined that allows some automation in the area of conflict resolution. As will be explained in more detail below, the assess operation verifies whether the target system is configured and running in a state that complies with the unified security profile. Upon receipt of an executor request, a remote agent prosecutes the above-described operations as received. In one embodiment, the remote agent may act as or with a translator to transform the general command sequences into a product/vendor-specific language or command set such that the rest of the architecture, as shown in FIG. 1, may be relatively vendor neutral.

Figure 3:
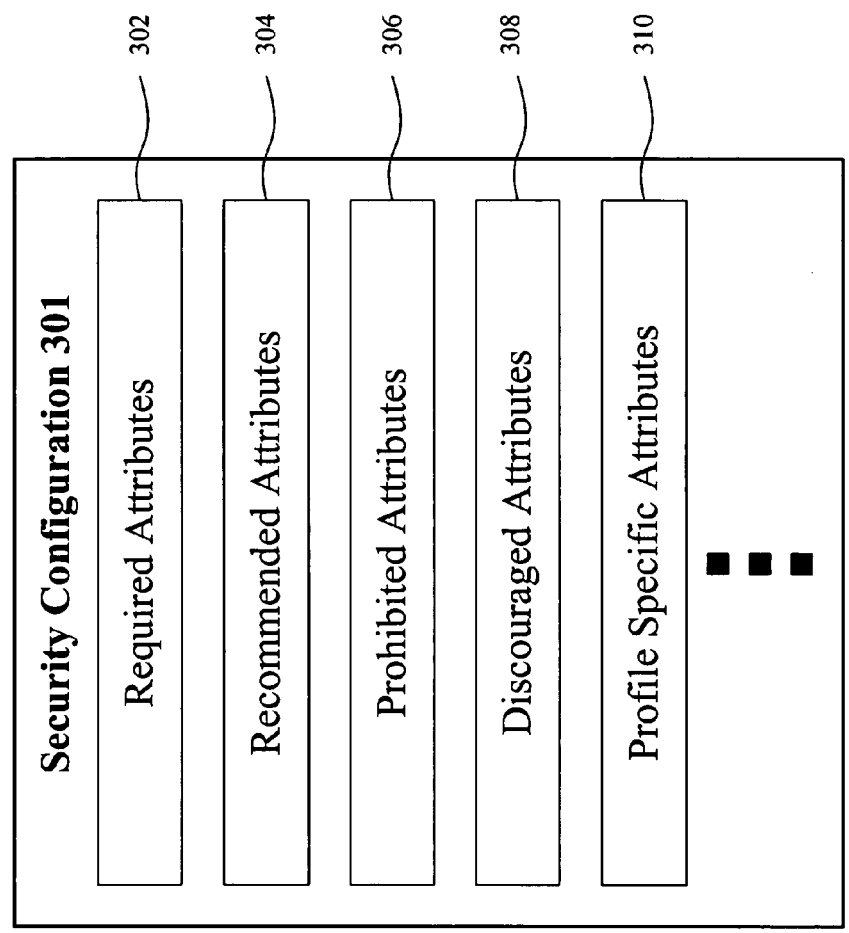
FIG. 3 is a detailed block diagram of a security configuration, in accordance with one embodiment of the present invention.

FIG. 3 is a detailed block diagram of a security configuration, in accordance with one embodiment of the present invention. Security configuration 301 is an abstract grouping of elements that describe the security requirements associated with an entity. In particular, security configuration 301 describes various attributes including authentication mechanisms, authorization methods, required services or features, prohibited services or features, as well as other characteristics that collectively serve to describe the security posture of the entity. As shown in FIG. 3, in one embodiment, security configuration 301 includes required attributes 302, recommended attributes 304, prohibited attributes 306, discouraged attributes 308, and profile specific attributes 310. Specifically, required attribute 302 is an attribute that is required. If the attribute is not met, the unified security profile cannot be formed. For example, one security configuration requires patch "A" revision "B" while a second security configuration prohibits patch "A" revision "B." As such, these two security configurations cannot be used on the same target system.

Recommended attributes 304 are attributes which should be included unless associated with or dependent on other attributes which are explicitly prohibited. Prohibited attributes 306 are attributes that are expressly prohibited and cannot be applied. For example, if an application expressly prohibits the installation of a particular patch, the patch cannot be installed. Discouraged attributes 308 are attributes that should not be included unless associated with or dependent on other attributes that are explicitly required. Profile specific attributes 310 are attributes that are specific to a particular profile, such as a Web server, that do not affect other attributes.

The attributes are extensible and can be supplemented to include platform, organization, or configuration specific entries. Security configuration 301 may be supplied by a vendor or developed by a user, and may be kept in files named according to applicable platform or service. In addition to storing security configuration 301 in files, the security configuration may also be stored in a network-reachable service such as relational database management systems (RDBMS) (e.g., Oracle, Sybase, etc.), Lightweight Directory Access Protocol (LDAP) servers, etc. The requirements of security configuration 301 may be specified in any suitable format, such as an extensible language (e.g., Extensible Markup Language (XML), Standard Generalized Markup Language (SGML), etc.) or a file based representation, that allows an arbitrary number of custom attributes. The following Table A is an exemplary XML representation of a security configuration, in accordance with one embodiment of the present invention.

TABLE A

<configuration name="Anonymous FTP">
<service name="FTP" class="network-service" depend="none">
<attribute state="required"" name="status" val="enabled">
<attribute state="required" name="user-allow" val="guest">
<attribute state="recommended" name="user-deny" val="*">
</service>
</configuration>

As shown in Table A, the XML representation includes a configuration name and named-value pairs that define the attributes. The configuration name is defined as "Anonymous FTP" and the security configuration includes two required attributes and one recommended attribute. Specifically, the security configuration requires file transfer protocol (FTP) service to be enabled, requires access for "guest" user, and recommends no other user access. The XML representation can additionally include dependencies that automatically bring in other dependent configurations.

Figure 4:
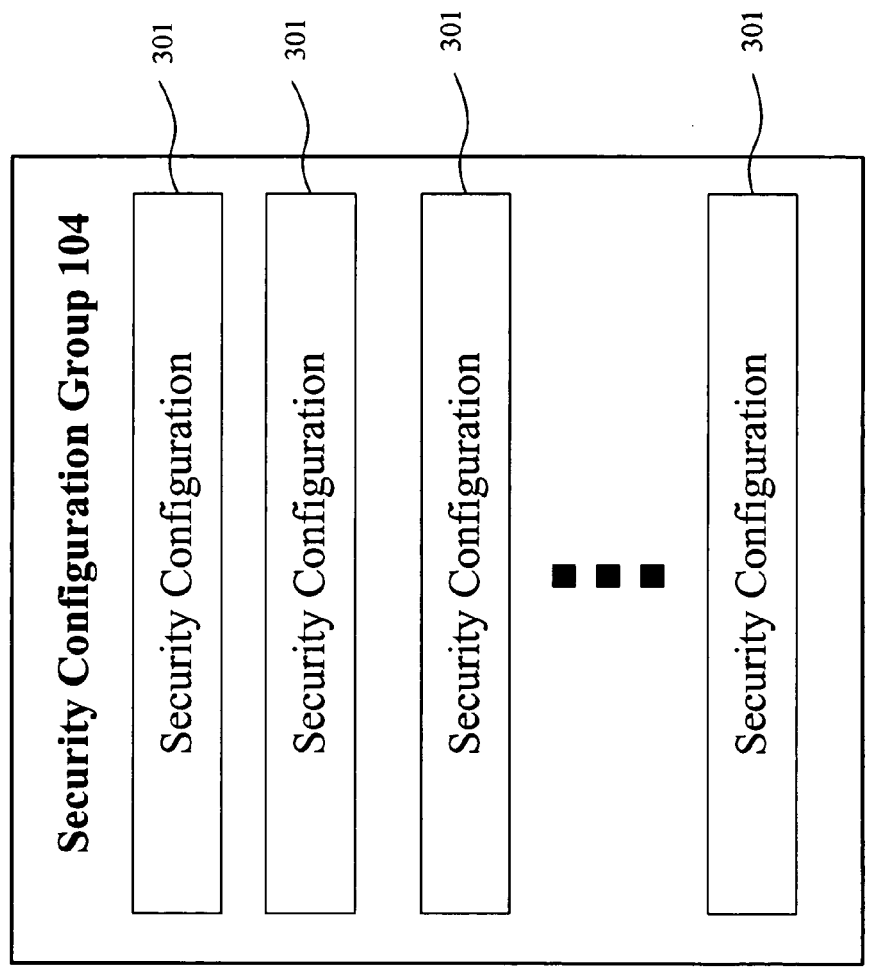
FIG. 4 is a detailed block diagram of a security configuration group, in accordance with one embodiment of the present invention.

FIG. 4 is a detailed block diagram of a security configuration group, in accordance with one embodiment of the present invention. As shown in FIG. 4, security configuration group 104 is a collection of related security configurations 301. Typically, a complex system or environment is comprised of many consolidated products and functions. As such, no single security configuration can be used to satisfy all the requirements, and security configuration group 104 is used to represent these more complex requirements. In one embodiment, security configuration group 104 is used as input to develop a unified security profile. The following Table B is an exemplary XML representation of security configuration group 104, in accordance with one embodiment of the present invention.

TABLE B

TABLE B-continued

<configuration>
<service name="HTTP" class="network-service" depend="none">
<attribute state="required" name="status" val="enabled">
</service>
</configuration>

As shown in Table B, security configuration group 104 named "Web-FTP-Server" includes the FTP security configuration of Table A and a security configuration of a Web service.

Figure 5:
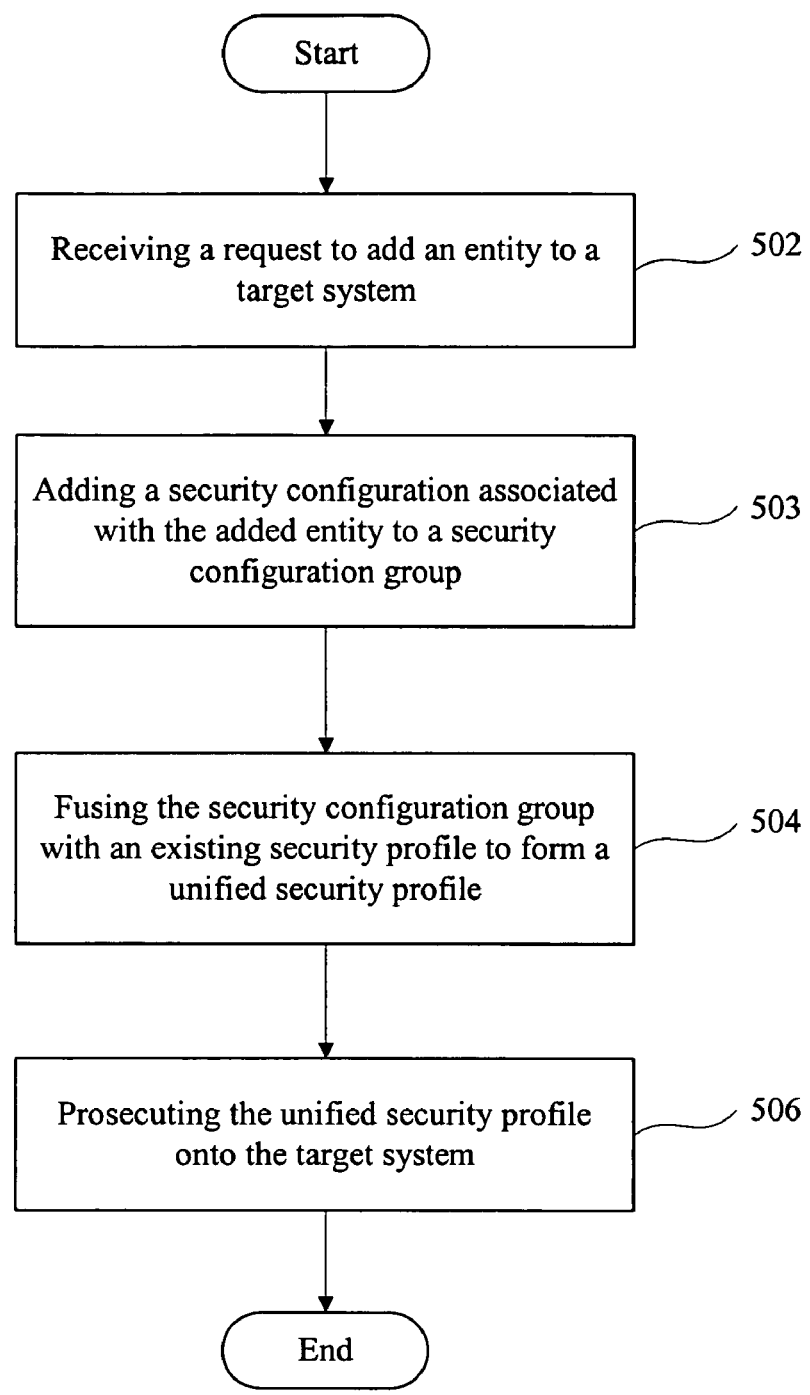
FIG. 5 is a simplified flowchart diagram of a high level overview for securing a target system when an entity is added to the target system, in accordance with one embodiment of the present invention.

FIG. 5 is a simplified flowchart diagram of a high level overview for securing a target system when an entity is added to the target system, in accordance with one embodiment of the present invention. Starting in operation 502, a request is received to add the entity to the target system. The target system has an existing security profile. A security configuration associated with the added entity is then selected from a security configuration library and added to a security configuration group in operation 503.

Next, the security configuration group is fused with the existing security profile in operation 504. As discussed above, during fusion, a check is conducted to determine whether there are any conflicts between the constraints of each security configuration within the security configuration group associated with the added entity and the existing security profile. The constraints are defined by the attributes of each security configuration. If there are no conflicts, the security configuration group associated with the added entity is merged with the existing security profile to form a unified security profile. The unified security profile is then prosecuted onto the target system in operation 506.

Figure 6:
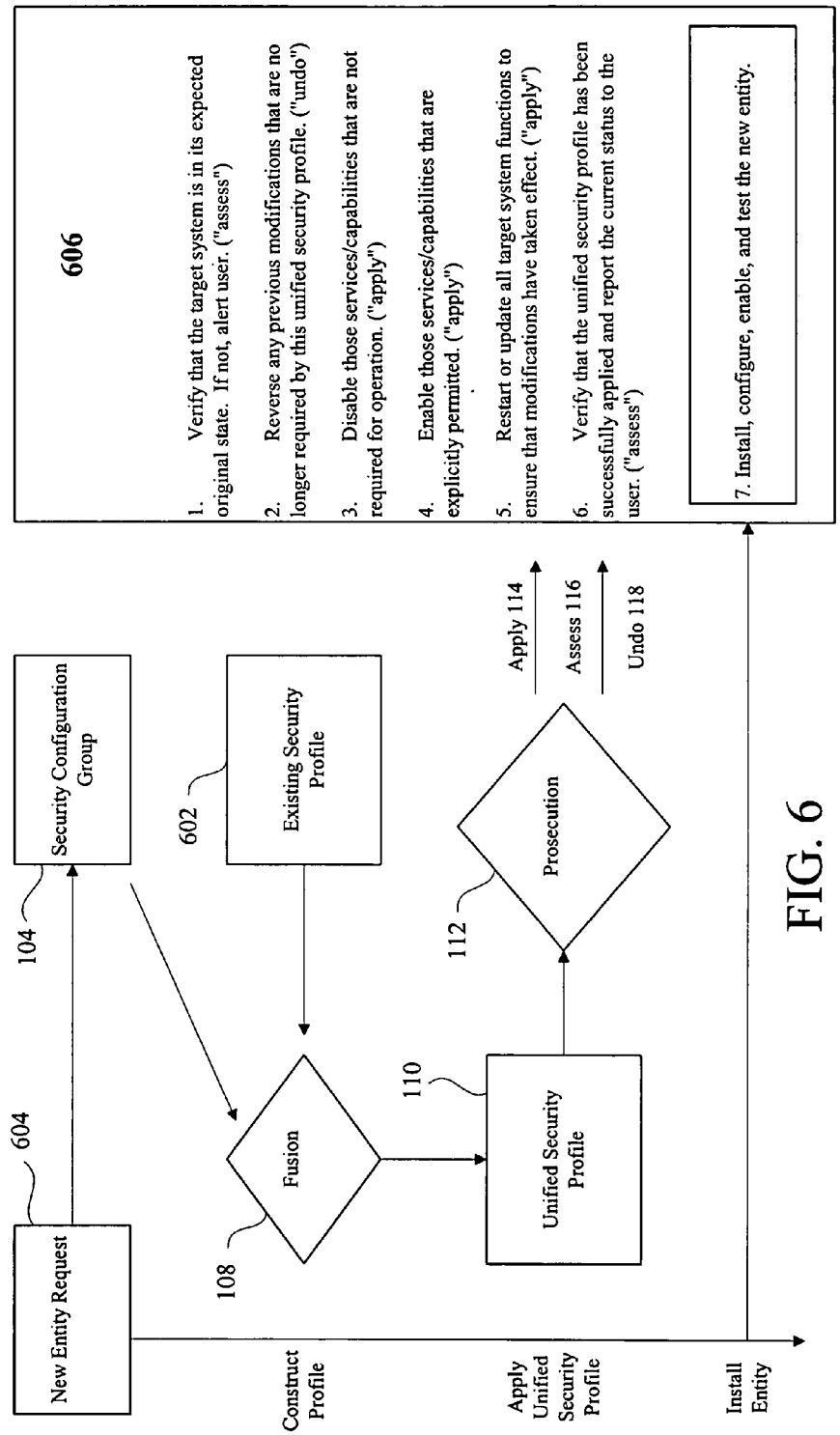
FIG. 6 is a detailed block diagram for securing a target system when an entity is added to the target system, in accordance with one embodiment of the present invention.

FIG. 6 is a detailed block diagram for securing a target system when an entity is added to the target system, in accordance with one embodiment of the present invention. In particular, FIG. 6 shows how existing security profile 602 of the target system changes as a result of security configuration group 104 associated with the added entity being fused with the existing security profile. Starting at operation 604, a request to add the entity is detected. As a result, security configurations associated with the added entity are selected from a security configuration library and added to security configuration group 104. Security configuration group 104 is then fused with existing security profile 602 to form unified security profile 110.

It should be appreciated that unified security profile 110 is a fusion of security configurations, such as the security configurations in security configuration group 104 and existing security profile 602, that collectively represent the security requirements of the target system. Specifically, unified security profile 110 is a processed form of security configurations. Unified security profile 110 is rendered in an actionable format that is used to dynamically change the security posture of the target system. In effect, unified security profile 110 represents the security posture end state of the target system. For example, the following Table C and Table D are exemplary XML representations of two individual security configurations, in accordance with one embodiment of the present invention.

TABLE C

<configuration name="Customer-Access">
<service name="FTP" class="network-service" depend="none">
<attribute state="required" name="status" val="enabled">

TABLE C-continued

```
<attribute state="required" name="user-allow" val="customerA">
<attribute state="required" name="user-allow" val="customerB">
<attribute state="recommended" name="user-deny" val="*">
<attribute state="recommended" name="ip-allow" val="192.168.0.0/24">
<attribute state="recommended" name="ip-deny" val="*">
</service>
</configuration>
```

TABLE D

```
<configuration name="Supplier-Access">
<service name="FTP" class="network-service" depend="none">
<attribute state="required" name="status" val="enabled">
<attribute state="required" name="user-allow" val="supplierA">
<attribute state="required" name="user-allow" val="supplierB">
<attribute state="recommended" name="user-deny" val="*">
<attribute state="recommended" name="ip-allow" val="10.1.0.0/24"
<attribute state="recommended" name="ip-deny" val="*">
</service>
<service name="SSH" class="network-service" depend="none">
<attribute state="required" name="status" val="enabled">
<attribute state="required" name="user-allow" val="supplierA">
<attribute state="required" name="user-allow" val="supplierB">
<attribute state="recommended" name="user-deny" val="*">
<attribute state="recommended" name="ip-allow" val="10.1.0.0/24">
<attribute state="recommended" name="ip-deny" val="*">
</service>
</configuration>
```

The two security configurations shown in Table C and Table D are then fused to form unified security profile 110. The following Table E is an exemplary XML representation of unified security profile 110 formed from the two security configurations shown in Table C and Table D, in accordance with one embodiment of the present invention.

TABLE E

```
<profile name="External-Access">
<service name="FTP" class="network-service" depend="none">
<attribute state="required" name="status" val="enabled">
<attribute state="required" name="user-allow" val="customerA">
<attribute state="required" name="user-allow" val="customerB">
<attribute state="required" name="user-allow" val="supplierA">
<attribute state="required" name="user-allow" val="supplierB">
<attribute state="recommended" name="user-deny" val="*">
<attribute state="recommended" name="ip-allow" val="192.168.0.0/24">
<attribute state="recommended" name="ip-allow" val="10.1.0.0/24">
<attribute state="recommended" name="ip-deny" val="*">
</service>
<service name="SSH" class="network-service" depend="none">
<attribute state="required" name="status" val="enabled">
<attribute state="required" name="user-allow" val="supplierA">
<attribute state="required" name="user-allow" val="supplierB">
<attribute state="recommended" name="user-deny" val="*">
<attribute state="recommended" name="ip-allow" val="10.1.0.0/24">
<attribute state="recommended" name="ip-deny" val="*">
</service>
</profile>
```

As shown in Table E, the format of unified security profile 110 in XML is the same as the XML formats of security configurations shown in Table C and Table D. Alternatively, unified security profile 110 may be translated during fusion 108 to other suitable formats. It should be appreciated that since unified security profile 110 is a collection of security configurations and the unified security profile is therefore bound by constraints defined by the attributes of each individual security configuration.

As shown in FIG. 6, after fusion 108, unified security profile 110 is prosecuted in operation 112 onto the target system. Prosecution 112 is responsible for implementing the security changes as defined by unified security profile 110. In other words, prosecution 112 takes the actionable steps defined in unified security profile 110 and implements those changes to adjust the security profile of the target system. Prosecution 112 is also responsible for preparing the target system for the change, which may include stopping or restarting services/functions, implementing system specific configuration changes, or other tasks prior to the application of unified security profile 110.

Specifically, prosecution 112 occurs via an executor that can execute apply operation 114, assess operation 116, and undo operation 118. Block 606 shows the operations 114, 116, and 118 as applied to secure the target system when the entity is added to the target system, in accordance with one embodiment of the present invention. First, assess operation 116 verifies that the target system is in its expected original state. If the target is not in its expected original state, then a user is alerted. The alert may have a simple "failure" message or contain detailed information describing the nature of the failure. This allows the user to more quickly and effectively isolate and mitigate the cause of the problem. Second, undo operation 118 reverses any previous modifications that are no longer required by unified security profile 110. Third, apply operation 114 disables services and capabilities that are not required for operation. Fourth, apply operation 114 enables services and capabilities that are explicitly permitted. Fifth, apply operation 114 restarts (i.e., reboot) the target system to ensure that the modifications have taken effect. Restarting the target system is not mandatory to ensure that the modifications have taken effect. Instead of restarting the target system, apply operation 114 automatically updates all target system functions to ensure that the modifications have taken effect. Sixth, assess operation 116 verifies that unified security profile 110 has been successfully applied and reports the current status to the user. Finally, the new entity is installed, configured, enabled, and tested.

Figure 7:
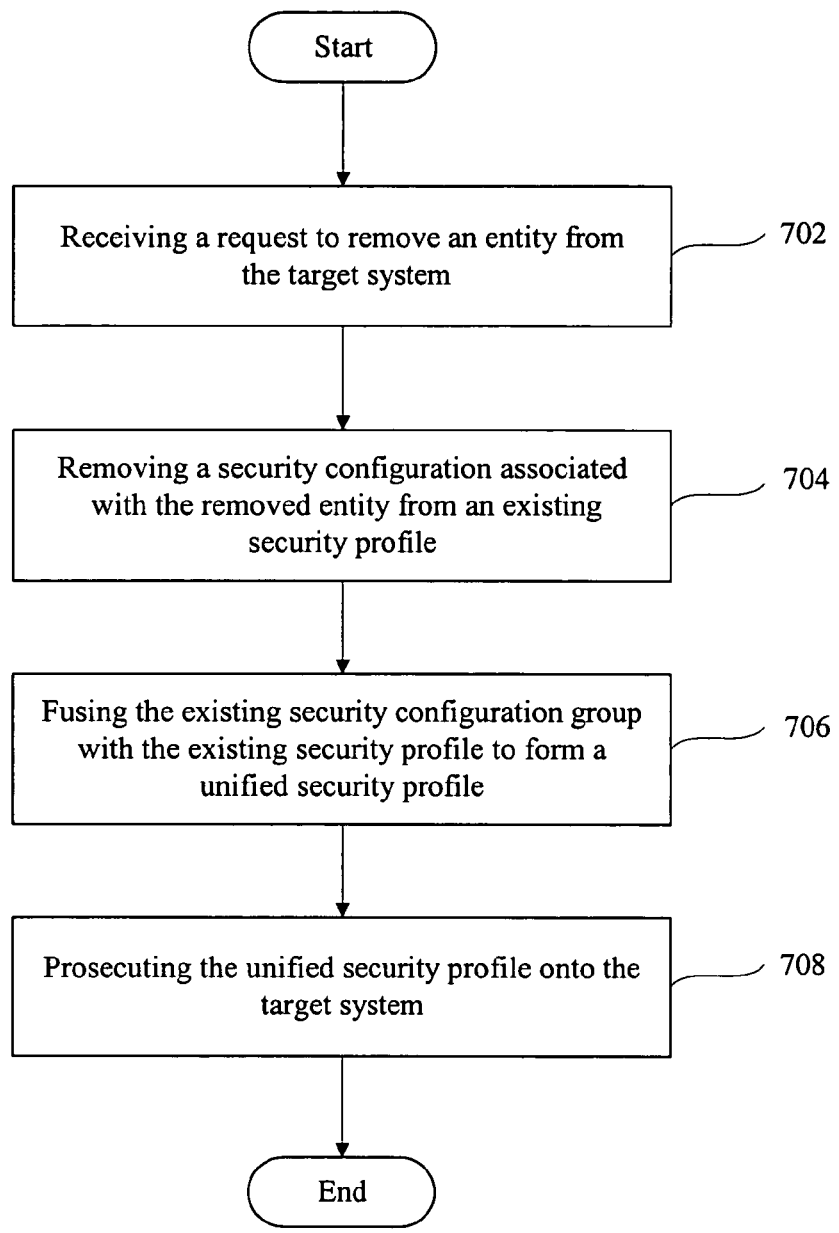
FIG. 7 is a simplified flowchart diagram of a high level overview for securing a target system when an entity is removed from the target system, in accordance with one embodiment of the present invention.

FIG. 7 is a simplified flowchart diagram of a high level overview for securing a target system when an entity is removed from the target system, in accordance with one embodiment of the present invention. Starting in operation 702, a request is received to remove an entity from the target system. Here, the target system has an existing security configuration group within an existing security profile. As a result, security configurations or groups of security configurations associated with the removed entity are removed from the existing security configuration group in operation 704. Thereafter, in operation 706, the existing security configuration group is fused with the existing security profile to form a unified security profile. During fusion, constraints between the security configurations within the existing security configuration group and within the existing security profile are checked. Subsequently, the existing security configuration group and the existing security profile are merged in compliance with the constraints to form the unified security profile. The unified security profile is then prosecuted onto the target system in operation 708.

Figure 8:
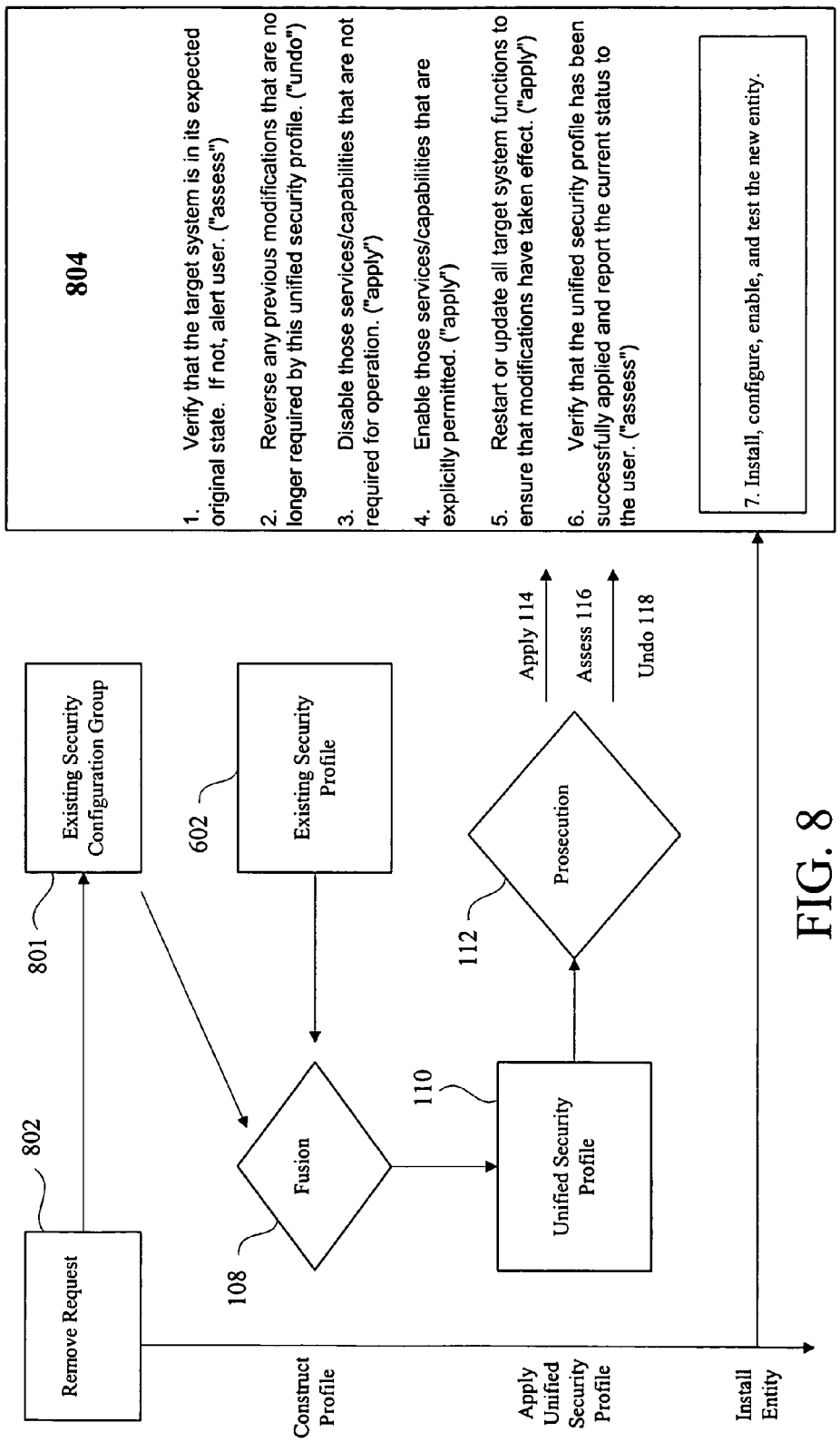
FIG. 8 is a detailed block diagram for securing a target system when an entity is removed from the target system, in accordance with one embodiment of the present invention.

FIG. 8 is a detailed block diagram for securing a target system when an entity is removed from the target system, in accordance with one embodiment of the present invention. Specifically, FIG. 8 shows how existing security profile 602 changes as a result of the removal of a security configuration associated with the removed entity from existing security configuration group 801. As shown in FIG. 8, starting in operation 802, a request to remove an entity is detected. As a result, the security configuration associated with the removed entity is removed from existing security configuration group

801. Existing security configuration group 801 is then fused with existing security profile 602 in operation 108 to form unified security profile 110.

After fusion 108, unified security profile 110 is prosecuted in operation 112 onto the target system. As discussed above, prosecution 112 occurs via an executor that can execute apply operation 114, assess operation 116, and undo operation 118. Similar to the prosecution operation when adding an entity, block 804 shows the operations 114, 116, and 118 as applied to secure the target system when the entity is removed from the target system, in accordance with one embodiment of the present invention. First, assess operation 116 verifies that the target system is in its expected original state. If the target system is not in its expected original state, then a user is alerted. Second, undo operation 118 reverses any previous modifications that are no longer required by unified security profile 110. Third, apply operation 114 disables services and capabilities that are not required for operation. Fourth, apply operation 114 enables services and capabilities that are explicitly permitted. Fifth, apply operation 114 restarts (i.e., reboots) the target system to ensure that the modifications have taken effect. Sixth, assess operation 116 verifies that unified security profile 110 has been successfully applied and reports the current status to the user. Finally, the new entity is installed, configured, enabled, and tested.

Figure 9:
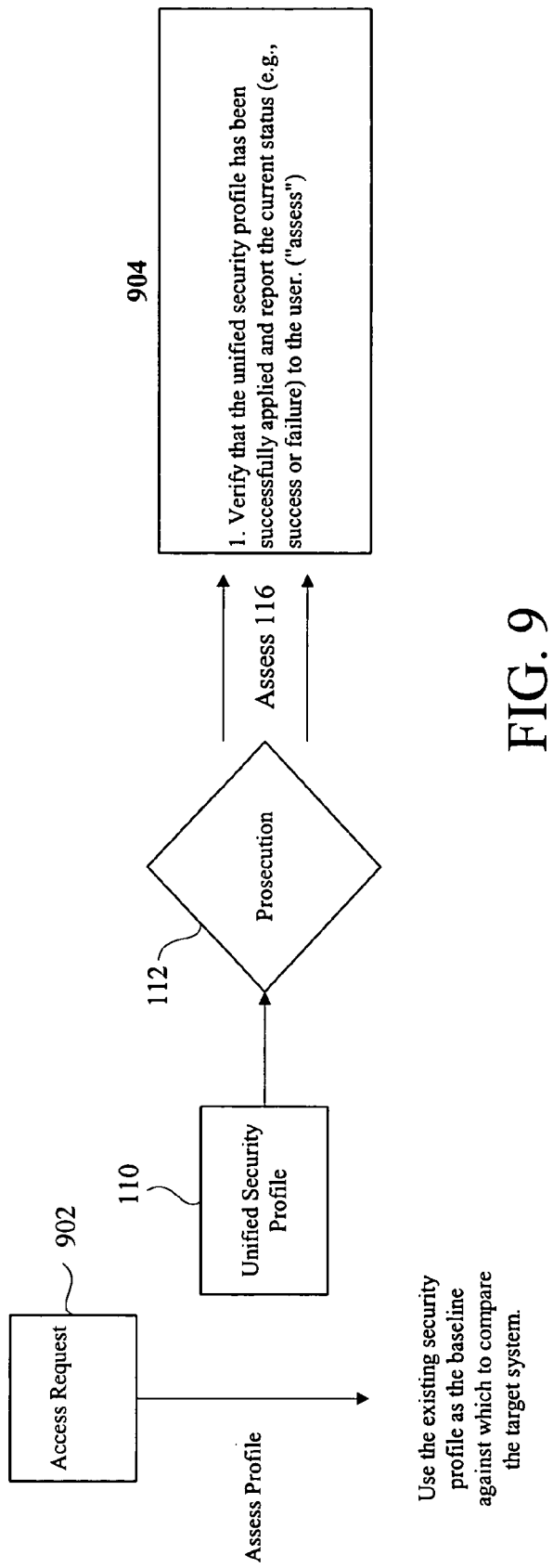
FIG. 9 is a detailed block diagram of an assessment of an existing security profile, in accordance with one embodiment of the present invention.

FIG. 9 is a detailed block diagram of an assessment of an existing security profile, in accordance with one embodiment of the present invention. An added feature of the present invention allows an existing security profile of a target system to be compared to an expected security profile. This assessment is conducted without making any changes to the existing security profile of the target system and the assessment may be used by a user to periodically evaluate the target system to insure that the expected security profile has been successfully applied and is configured correctly. For example, the assessment may be done across a network of target systems to provide a spot check to ensure that the target systems are in a known and consistent configuration. As shown in FIG. 9, a request is received to assess the target system in operation 902. As a result, an executor prosecutes 112 unified security profile 110 onto target system 122. However, in this case, the prosecution occurs only through assess operation 116. The existing security profile (i.e., unified security profile 110) is used as a baseline against which to compare the target system. Subsequently, in operation 904, assess operation 116 verifies that unified security profile 110 has been successfully applied and reports the current status (e.g., success or failure) to the user.

Figure 10:
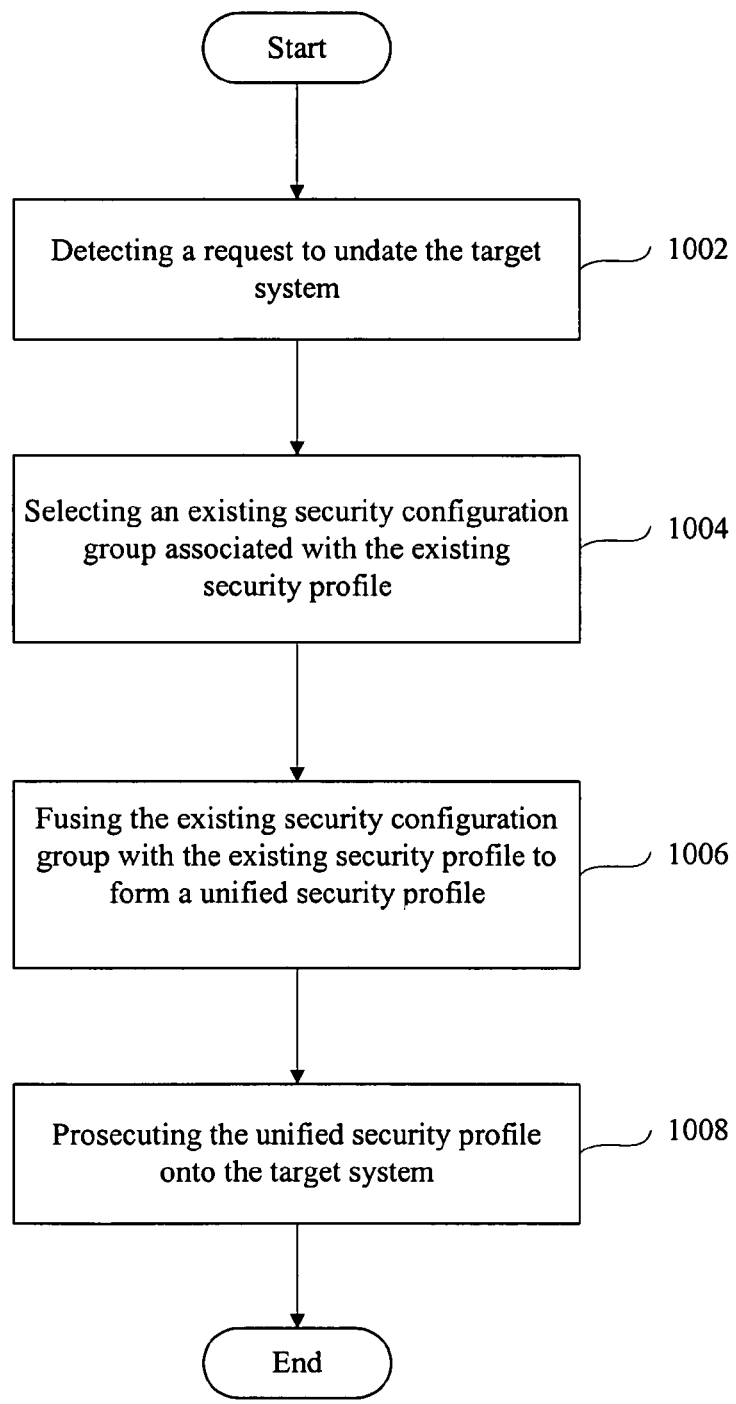
FIG. 10 is a simplified flowchart diagram of a target system being updated, in accordance with one embodiment of the present invention.

FIG. 10 is a simplified flowchart diagram of a target system being updated, in accordance with one embodiment of the present invention. In addition to adding and removing an entity from the target system, the target system may also be updated. Update is needed to account for changes to security configurations. If security configurations are changed, then target systems using those same security configurations are now out of synchronization with the changed security configuration requirements. The update function could be used to re-build a security profile of the target system using the updated security configurations. As shown in FIG. 10, starting in operation 1002, a request to update the target system is detected. The target system has an existing security profile. A security configuration group associated with the existing security profile is selected in operation 1004 and fused with the existing security profile to form a unified security profile in operation 1006. The unified security profile is then prosecuted onto the target system in operation 1008. It should be appreciated that no security configurations are added or removed from the existing security profile and, in effect, the existing security profile is updated to use the changed security configurations.

Figure 11:
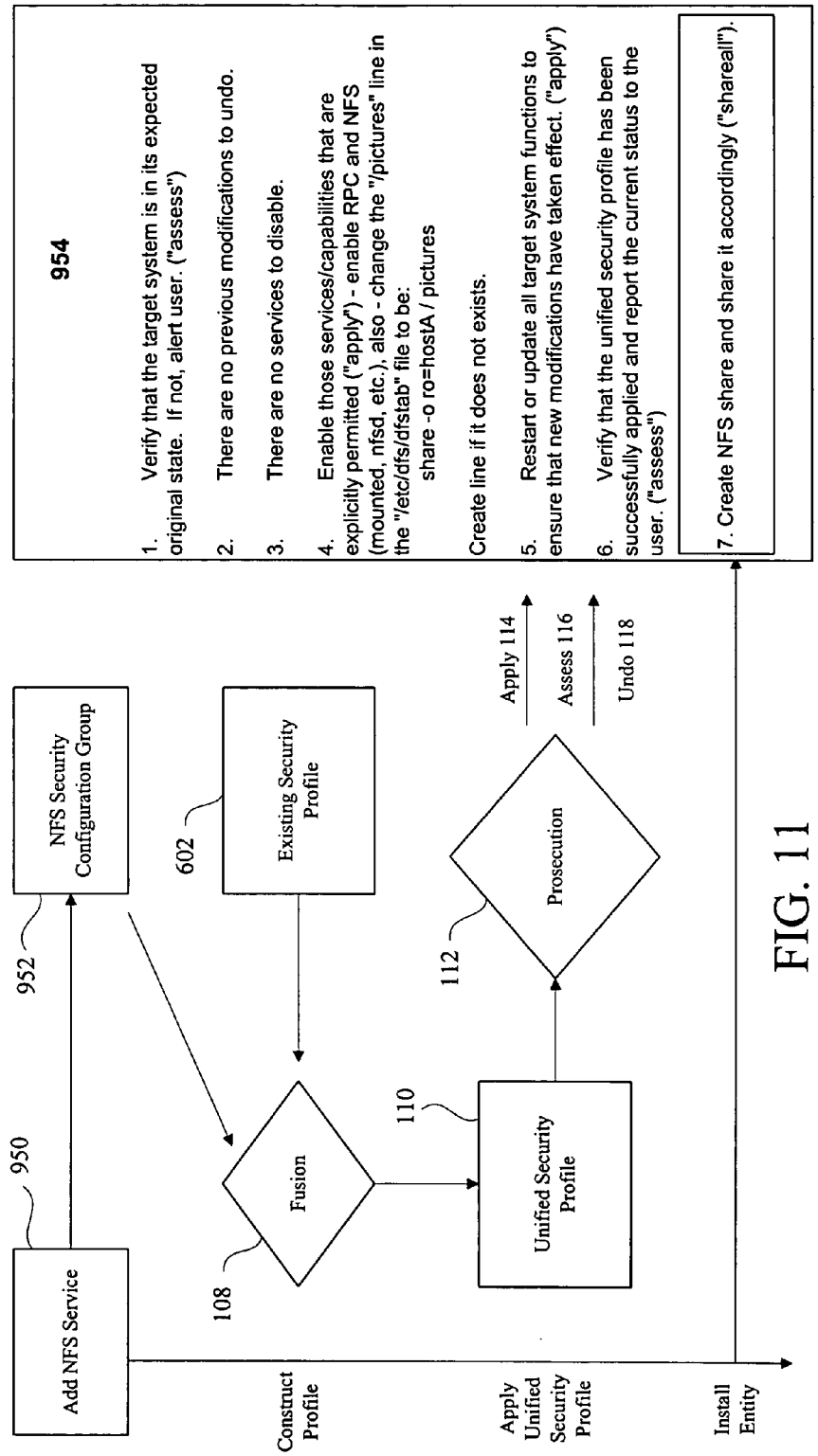
FIG. 11 is a detailed block diagram of an exemplary, automated method for securing a target system when a Network File System (NFS) is added to the target system, in accordance with one embodiment of the present invention.

FIG. 11 is a detailed block diagram of an exemplary, automated method for securing a target system when a Network File System (NFS) is added to the target system, in accordance with one embodiment of the present invention. Specifically, the target system does not provide NFS services in its default configuration. As is known to those skilled in the art, an NFS service is a client/server application designed by Sun Microsystems that allows all network users to access shared files stored on computers of different types. In this case, the NFS service needs to be enabled on the target system and access to NFS share needs to be restricted to "hostA."

As shown in FIG. 11, starting at operation 950, a request to add the NFS service to the target system is detected. A new NFS security configuration associated with the added NFS service is created. The following Table F is an exemplary XML representation of the NFS security configuration that allows an NFS share (/pictures) to be exported to "hostA," in accordance with one embodiment of the present invention.

TABLE F

```
<configuration name="NFS-Share-Pictures">
<service name="NFS" class="network-service" depend="RPC">
<attribute state="required" name="status" val="enabled">
<attribute state="required" name="share" val="/pictures"
<attribute state="required" name="share-mode" val="read-only">
<attribute state="required" name="ip-allow" val="hostA">
<attribute state="required" name="ip-deny" val="*">
</service>
</configuration>
```

The NFS security configuration is then selected from a security configuration library and added to NFS security configuration group 952. NFS security configuration group 952 is then fused with existing security profile 602 in operation 108. During fusion 108, a check is conducted to determine whether there are any conflicts between constraints of the NFS security configuration and security configurations within existing security profile 602. If there are no conflicts, NFS security configuration group 952 is merged with existing security profile 602 to form unified security profile 110. The following Table G is an exemplary XML representation of fused unified security profile 110, in accordance with one embodiment of the present invention.

TABLE G

```
<profile name="Web Server">
<service name="NFS" class="network-service" depend="RPC">
<attribute state="required" name="status" val="enabled">
<attribute state="required" name="share" val="/pictures">
<attribute state="required" name="share-mode" val="read-only">
<attribute state="required" name="ip-allow" val="hostA">
<attribute state="required" name="ip-deny" val="*">
</service>
<service name="RPC" class="service-framework" depend="none">
<attribute state="required" name="status" val="enabled">
</service>
<service name="HTTP" class="network-service" depend="none">
<attribute state="required" name="status" val="enabled">
<attribute state="required" name="ip-allow" val="*">
</service>
<service name= "*">
<attribute state= "recommended" name="status" val="disabled">
</service>
</configuration>
```

Unified security profile 110 is then prosecuted onto the target system in operation 112. Prosecution 112 occurs via an executor that can execute apply operation 114, assess operation 116, and undo operation 118. Block 954 shows the operations 114, 116, and 118 as applied to secure the target system when NFS service is added to the target system. First, assess operation 116 verifies that the target system is in its expected original state. If the target system is not in its expected original state, then a user is alerted. Second, since there are no previous modifications, undo operation 118 is not executed. Third, apply operation 114 is not executed to disable services because there are no services to disable in this case. Fourth, apply operation 114 enables Remote Procedure Call (RPC) and NFS (e.g., mountd, nfsd, etc.) and changes the "/pictures" line in the "/etc/dfs/dfstab" file to be "share-o ro=hostA/pictures." Fifth, apply operation 114 restarts or updates all functions of the target system to ensure that new settings have taken effect. In particular, apply operation 114 starts "rpcbind," "mountd," and "nfsd." Sixth, assess operation 116 verifies that unified security profile 110 has been successfully applied and reports the current status to the user. Specifically, assess operation 116 ensures that "rpcbind," "mountd," and "nfsd" are running and the "/pictures" is available only to "hostA." Finally, the NFS service is created and shared accordingly.

The functionality described above for securing a target system may be incorporated into a system. In one exemplary embodiment, the system includes a central processing unit (CPU) and a memory. One skilled in the art will appreciate that the CPU may be coupled to the memory through a common bus to enable communication between the CPU and the memory. The memory stores an adaptive security program module that includes the logic to secure the target system. For example, in one embodiment, the adaptive security program module includes: logic for detecting a request to change an entity in the target system; logic for adding a security configuration associated with the entity to a security configuration group if the request is to add the entity to the target system; logic for removing the security configuration associated with the entity from an existing security configuration group if the request is to remove the entity from the target system; logic for fusing the security configuration group with an existing security profile to form a unified security profile when the entity is added to the target system; logic for fusing the existing security configuration group with the existing security profile to form the unified security profile when the entity is removed from the target system; and logic for prosecuting the unified security profile onto the target system. In turn, the CPU executes the adaptive security program module stored in the memory.

In summary, the above-described invention provides automated methods and systems for securing a target system in an adaptive computer environment. The automatic fusion of security configurations to form a unified security profile and the prosecution of the unified security profile onto the target system automates the securing process. Furthermore, automating the securing process improves the consistency and reliability of securing the target system because human error is minimized. Finally, the invention described above provides flexible, pluggable interfaces for creating customized security configurations based on individual customer and site requirements.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

In the proceeding description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

What is claimed is:

1. An automated method for securing a target system, comprising:
    detecting a request to change an entity in the target system, the target system having an existing security profile;
    constructing a security configuration group associated with the entity, the security configuration group including security policy of the entity with associated constraints;
    fusing the security configuration group with the existing security profile to form a unified security profile, the fusing of the security configuration group including automatically resolving any conflict with constraints associated with security policy of the entity; and
    prosecuting the unified security profile onto the target system.

2. The automated method of claim 1, wherein constructing the security configuration group includes
- selecting a security configuration associated with the entity; and
- adding the security configuration to the security configuration group,
- wherein the request to change the entity is a request to add the entity to the target system.

3. The automated method of claim 1, wherein constructing the security configuration group includes
- removing a security configuration associated with the entity from the security configuration group,
- wherein the request to change the entity is a request to remove the entity from the target system.

4. The automated method of claim 1, wherein fusing the security configuration group with the existing security profile to form the unified security profile includes
- checking for conflict amongst constraints between security configurations within the security configuration group and security configurations within the existing security profile;
- upon encountering the conflict,
- generating a notification event when a conflicting constraint cannot be automatically resolved;
- terminating the formation of a unified security profile; and
- upon resolution of the conflict or upon encountering no conflict,
- merging the security configuration group and the existing security profile in compliance with the constraints to form the unified security profile.

5. The automated method of claim 1, wherein prosecuting the unified security profile includes
- applying a modification to the target system in accordance with the unified security profile.

6. The automated method of claim 5, wherein the modification to the target system is defined as one or more of an installation of software, a removal of the software, a configuration of a feature, an enablement of the feature, a disablement of the feature, a configuration of a component, an enablement of the component, and a disablement of the component.

7. The automated method of claim 5, wherein prosecuting the unified security profile includes
- undoing the modification applied to the target system.

8. The automated method of claim 5, wherein prosecuting the unified security profile includes
- assessing whether the target system is configured and running in a state that complies with the unified security profile.

9. The automated method of claim 1, wherein the security configuration group is comprised of one or more security configurations that are related.

10. The automated method of claim 9, wherein each of the security configurations is an abstract grouping of elements that describe requirements of one of a hardware platform, a hardware component, and a software component.

11. The automated method of claim 1, wherein the target system is defined by one or more of a Web server, an application server, an identity server, an authentication server, a directory server, a database server, a file server, a print server, a proxy server, a naming service server, a time server, a log server, a Solaris operating system, a Linux operating system, a Microsoft Windows operating system, an IBM Advanced Interactive eXecutive (AIX) operating system, a Hewlett-Packard-UX operating system, and a Silicon Graphics IRIX operating system.

12. The automated method of claim 1, wherein the entity is a component of the target system.

13. The automated method of claim 12, wherein the entity is defined by one or more of a software function, a software configuration, a hardware function, a hardware configuration, a device, a system of devices, an application program, a system of application programs, a system application, a system of system applications, an operating system, and a framework service.

14. A method for securing a target system, comprising:
- receiving a request to add an entity to the target system, the target system having an existing security profile;
- adding a security configuration associated with the entity to a security configuration group the security configuration associated with the entity including associated constraints;
- fusing the security configuration group with the existing security profile to form a unified security profile, the fusing of the security configuration group including automatically resolving any conflict with constraints associated with the security policy of the entity; and
- prosecuting the unified security profile onto the target system.

15. The method of claim 14, further comprising:
- selecting the security configuration associated with the entity.

16. The method of claim 15, wherein selecting the security configuration associated with the entity includes
- selecting the security configuration from a security configuration library, the security configuration library being populated with security configurations.

17. The method of claim 16, wherein the security configuration library is a storage repository.

18. The method of claim 14, wherein fusing the security configuration group with the existing security profile to form the unified security profile includes
- checking for conflict amongst constraints between the security configuration within the security configuration group and security configurations within the existing security profile;
- upon encountering the conflict,
- generating a notification event and terminating the formation of the unified security profile when the conflict cannot be automatically resolved; and
- upon resolution of the conflict or upon encountering no conflict,
- merging the security configuration group and the existing security profile in compliance with the constraints to form the unified security profile.

19. A method for securing a target system, comprising:
- receiving a request to remove an entity from the target system, the target system having an existing security configuration group within an existing security profile, the security configuration group including security policy of the entity with associated constraints;
- removing a security configuration associated with the entity from the existing security configuration group;
- fusing the existing security configuration group with the existing security profile to form a unified security profile, the fusing of the security configuration group including automatically resolving any conflict with constraints associated with security policy of the entity; and
- prosecuting the unified security profile onto the target system.

20. The method of claim 19, wherein fusing the existing security configuration group with the existing security profile to form the unified security profile includes checking for conflict amongst constraints between security configurations within the existing security configuration group and security configurations within the existing security profile;

upon encountering the conflict,
generating a notification event when a conflicting constraint cannot be automatically resolved;
terminating the formation of a unified security profile; and upon resolution of the conflict or upon encountering no conflict,
merging the existing security configuration group and the existing security profile in compliance with the constraints to form the unified security profile.

21. A system for securing a target system, comprising:
a memory for storing an adaptive security program module; and
a central processing unit for executing the adaptive security program module stored in the memory,
the adaptive security program module including,
logic for detecting a request to change an entity in the target system, the target system having an existing security profile;
if the request is to add the entity to the target system, logic for adding a security configuration associated with the entity to a security configuration group;
if the request is to remove the entity from the target system, logic for removing the security configuration associated with the entity from an existing security configuration group;
logic for fusing the security configuration group with the existing security profile to form a unified security profile when the entity is added to the target system;
logic for fusing the existing security configuration group with the existing security profile to form the unified security profile when the entity is removed from the target system; and
logic for prosecuting the unified security profile onto the target system,
wherein the detection of the request to change the entity, the fusion to form the unified security profile, and the prosecution of the unified security profile are automatic, wherein the security configuration including security policy of the entity with associated constraints and the fusing of the security configuration group including automatically resolving any conflict with constraints associated with security policy of the entity.

22. An automated method for securing a target system, comprising:
detecting a request to update the target system, the target system having an existing security profile;
selecting an existing security configuration group associated with the existing security profile, the security configuration group including security policy of an entity with associated constraints;
fusing the existing security configuration group with the existing security profile to form a unified security profile, the fusing of the security configuration group including automatically resolving any conflict with constraints associated with security policy of the entity; and
prosecuting the unified security profile onto the target system.

23. The automated method of claim 22, wherein selecting the existing security configuration group associated with the existing security profile includes
selecting a security configuration within the existing security configuration group from a security configuration library, the security configuration library being populated with updated security configurations.

24. An automated method for securing a target system, comprising:
detecting a request to change an entity in the target system;
constructing a security configuration group associated with the entity, the security configuration group including security policy of the entity with associated constraints;
fusing the security configuration group to form a unified security profile, the fusing of the security configuration group including automatically resolving any conflict with constraints associated with security policy of the entity; and
prosecuting the unified security profile onto the target system.

* * * * *